Aug. 13, 1957     K. J. KNUDSEN     2,802,988
LARGE-DEFLECTION ELECTRICAL INSTRUMENT
Filed July 17, 1951     2 Sheets-Sheet 2
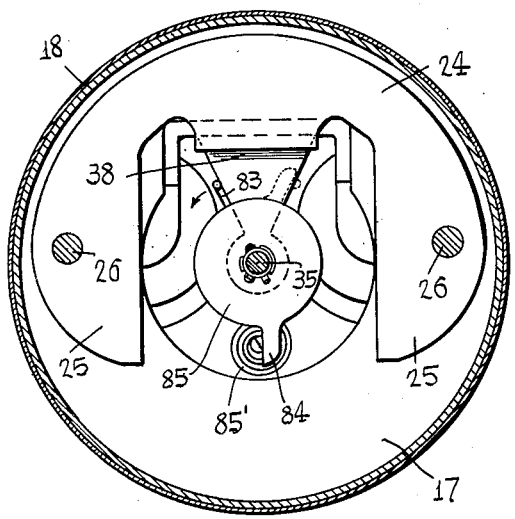
Fig. 4
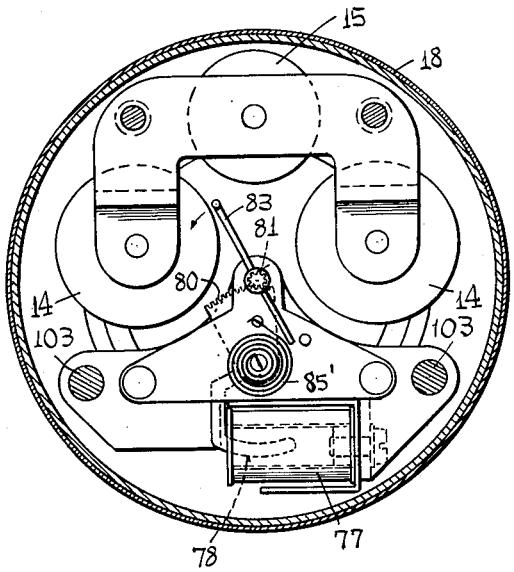
Fig. 5
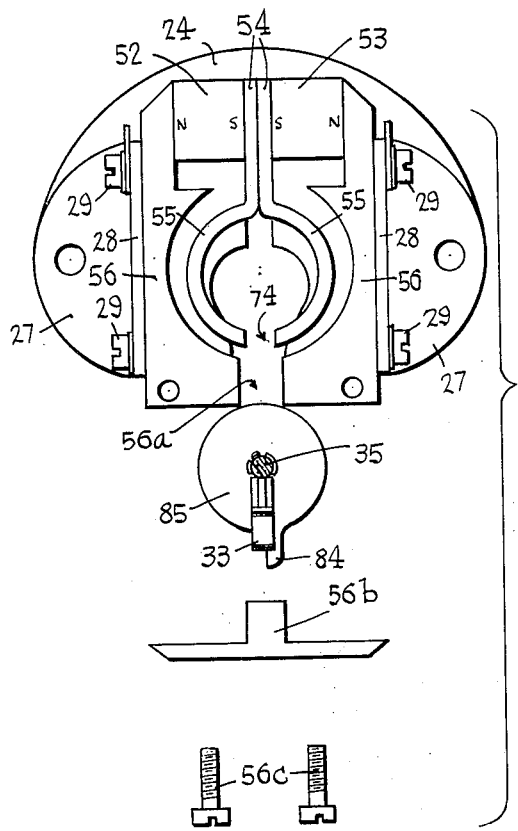
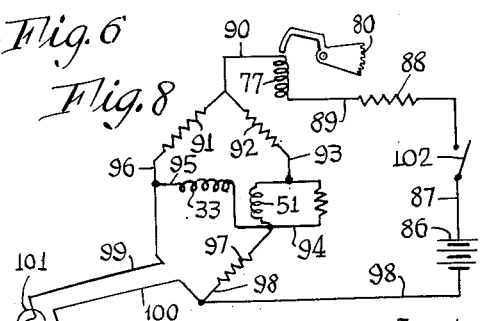
Fig. 7
Fig. 6
Fig. 8
Inventor
Knud J. Knudsen
By
Johnson and Kline
Attorneys United States Patent Office 2,802,988
Patented Aug. 13, 1957

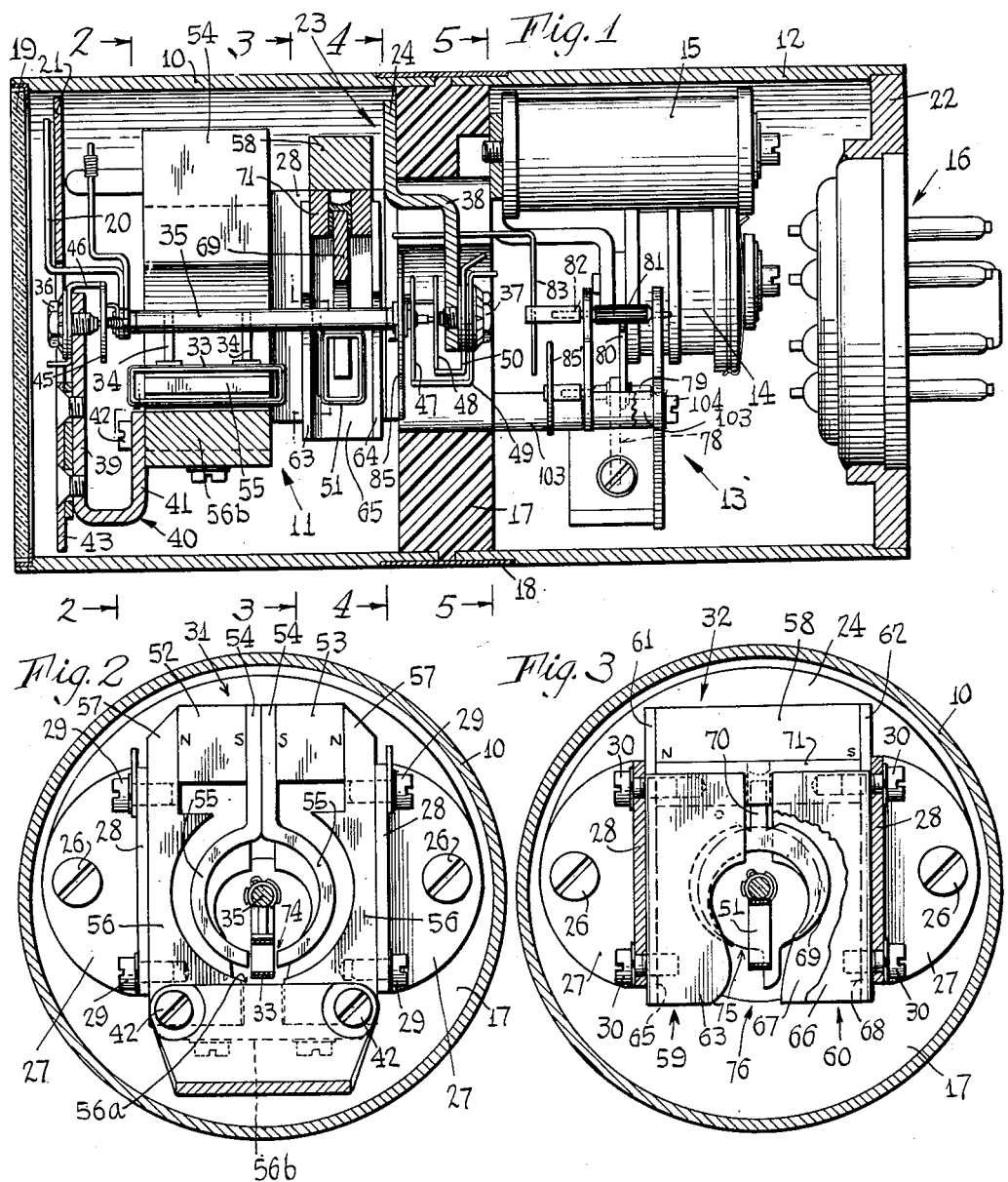

2,802,988

LARGE-DEFLECTION ELECTRICAL INSTRUMENT

Knud J. Knudsen, Naugatuck, Conn., assignor to The Lewis Engineering Company, Naugatuck, Conn., a corporation of Connecticut Application July 17, 1951, Serial No. 237,120

4 Claims. (Cl. 324—150)

This invention relates to electric instruments such as meters and the like, and more particularly to large-deflection multicoil meters of the class including ratio meters.

In connection with aircraft, large-deflection ratio meters are utilized in systems which indicate temperatures varying over a wide range, as for example temperatures between minus 70° C. and plus 300° C. Such large-deflection ratio meters are incorporated in a bridge circuit connected to a resistance thermometer bulb, and comprise deflecting and restoring coils movable as a unit in magnetic fields established by permanent magnets.

Ratio meters as thus used are required to be extremely sensitive and accurate; they involve magnetic fields acting on the coils through a large arc to secure the required large deflection characteristic. During the assembling of such meters, or during servicing, where it becomes necessary to install the movable coil system on the field structure or dismantle it therefrom, facility and quickness are desirable. Thus, the fewer the parts which are involved, the better. Moreover, considering a servicing operation, any disturbance or removal of parts of the basic field structure which would alter the original flux pattern could adversely affect the accuracy of the instrument in its subsequent operation, and accordingly is highly undesirable.

An object of this invention is to provide an improved multicoil electrical instrument or meter of the large deflection type, as for example a ratio meter, wherein the movable coil system of the instrument may be very simply assembled to the field structure or removed therefrom, particularly without disturbing the basic field structure, or any part of the field structure which would permanently adversely affect or alter the essential flux pattern of said structure and thus impair the accuracy of the instrument.

Another object of the invention is to provide an improved multicoil large-deflection meter as above characterized, which is simple and compact in its construction, and is easy to assemble, or to dismantle if servicing should be required.

Still another object of the invention is to provide an improved instrument or meter as set forth above, which has a substantially uniform scale so that all readings may be easily and quickly obtained.

A still further object of the invention is to provide, in an electrical meter of the type wherein the indicator means is not normally urged to off-scale position, improved sweep-off means for clearing the pointer from the scale during periods when the instrument is not in use.

Other features and advantages will hereinafter appear.

In the accompanying drawings:

Figure 1 is an axial sectional view of a ratio meter made in accordance with the invention.

Fig. 2 is a transverse sectional view taken on line 2—2 of Fig. 1.

Fig. 3 is a transverse sectional view taken on line 3—3 of Fig. 1.

Fig. 4 is a transverse sectional view taken on line 4—4 of Fig. 1.

Fig. 5 is a transverse sectional view taken on line 5—5 of Fig. 1.

Fig. 6 is a front exploded view of the instrument movement of the meter, with the casing removed and showing the movable coil system and flux bridging member separated from the unit.

Fig. 7 is a front or face view of the instrument, showing the pointer and scale.

Fig. 8 is a schematic diagram showing a temperature-measuring bridge circuit which includes the coils of the meter.

Referring to Fig. 1, the present improved ratio meter comprises a front cylindrical casing part 10 housing a sensitive instrument movement 11, and a rear cylindrical casing part 12 housing a pointer sweep-off mechanism 13 and components 14 and 15 of a bridge circuit, also carrying a connector plug 16.

The casing parts 10 and 12 are secured together in end-to-end relation on opposite sides of a transverse wall 17 which is preferably formed of molded insulating composition. The parts 10 and 12 may be secured to the wall 17 by inwardly extended pins or screws (not shown), and may be hermetically sealed at their adjacent ends by providing an encircling metal band 18 which is sweated or soldered in place. At its front end, the casing part 10 has a transparent window 19, through which a pointer 20 and scale 21 are visible. The casing part 12 at its rear has a transverse closure-wall 22 in which the connector plug 16 is mounted.

Referring to Figs. 1, 2 and 3, the instrument movement 11 is mounted in the casing 10 by means of a rear bridge assembly 23 comprising a bearing plate 24 having apertured ears 25 which are secured to the wall 17 by screws 26. The bridge assembly 23 also includes a pair of angle brackets 27 secured under the screws 26 and having forwardly extending legs 28 fastened by screws 29 and 30 to permanent-field structures 31 and 32 respectively.

The field structure 31 forms part of the deflecting system of the instrument movement, and the field structure 32 part of the restoring system of the movement.

Associated with the field structure 31 is a rectangular deflecting coil 33 mounted by means of pins 34 on a shaft 35 carried in bearing screws 36 and 37, the latter screw being mounted on an offset portion 38 of the bearing plate 24. The bearing screw 36 is carried on the front leg 39 of a U-shaped bracket 40 having a rear leg 41 secured by screws 42 to the field structure 31. The front leg 39 of the bracket 40 also carries a circular dial 43 having the scale 21, Figs. 1 and 7, over which the pointer 20 travels. As shown in Fig. 1, the pointer 20 is mounted on the front end of the shaft 35, said end of the shaft also carrying a spiral coil spring 45 secured to a regulator member 46. At its rear end the shaft 35 carries a pair of spiral coil springs 47 and 48 secured to regulator members 49 and 50 respectively. For cooperation with the restoring field structure 32 the shaft 35 carries a rectangular restoring coil 51.

Referring to Fig. 2, the field structure 31 comprises a pair of aligned permanent bar magnets 52 and 53 having like poles adjacent each other, there being interposed between the magnets, pole pieces 54 having semi-cylindrical portions 55. In the illustration, the juxtaposed magnet poles are labeled south, and accordingly the pole pieces 55 manifest a south polarity. Coextensive with and spaced from the pole pieces 55 are curved pole pieces 56 having extensions 57 secured to the remote poles of the magnets 52 and 53, said remote poles in the present instance being north.

Referring to Fig. 2, the lower end portions of the pole pieces 56 are separated from each other by a space 56a, and said space is occupied by a magnetic bridge member 56b secured to the pole pieces by screws 56c.

It will be noted that the screws 29 passing through the angle brackets 27 are threaded into the pole pieces 56, as are also the screws 42 which fasten the U-shaped bracket 40, thus making a unitary assemblage of the two field structures 31 and 32.

The deflecting coil 33 is so mounted that it can link either one of the pole pieces 55 and travel in a circular path through an arc of almost three right angles.

Referring to Fig. 3, the restoring field structure comprises a permanent magnet 58 having north and south poles as labeled, said magnet being secured to channel-shaped pole pieces 59 and 60 by means of extensions 61 and 62 on said pole pieces respectively.

As shown in Fig. 1, the channel-shaped pole piece 59 has front and rear flanges 63 and 64, connected together by a yoke portion 65. The pole piece 60 is constructed in a similar way, with front and rear flanges 66 and 67 respectively, connected together by a yoke 68. The pole pieces 59 and 60 are generally similar, except for the exact shape of the front and rear flanges thereof, as will be later brought out in more detail.

Interposed between the front and rear flanges of the pole pieces 59 and 60 is a C-shaped core 69 having at its midpoint an outwardly extended supporting leg 70 carried in a non-magnetic mounting block 71 arranged to be co-extensive with the magnet 58. The core 69 is thus not closely magnetically connected or coupled to the magnet 58 but merely acts as an intermediary between the poles 59 and 60, providing a more permeable flux path between said poles. Flux lines may be thought of as entering the core 69 from the pole 59, and leaving the core 69 for the pole 60. By this organization the magnetic field of the poles 59 and 60 and coil 69 will act on the restoring coil 51 when the latter is energized with direct current to maintain the coil in the centralized or intermediate position shown in Fig. 3, and resist movement of the coil in either direction from said intermediate position.

It will be noted that two of the screws 30 which pass through the angle brackets 27 are threaded into the mounting block 71, the remaining two screws 30 being threaded into the yoke portions 65 and 68 of the pole pieces 59 and 60 respectively.

The restoring coil 51 is arranged so that it can link the core 69 and travel in a circular path of almost three right angles.

It will be observed that the instrument movement 11 constitutes a unit assembly, comprising the deflecting field structure 31, the restoring field structure 32, the angle brackets 27 securing together the deflecting and restoring field structures, the front bearing bracket 40, the rear bearing plate 24, the movable coil system comprising the shaft 35 and coils 33 and 51, the coil springs 45, 47 and 48, and pivots 36 and 37 for the shaft 35. Also included in this unit assembly is the dial 43 and the pointer 20. Removal of the instrument movement 11 from the casing 10 may be effected by first removing the front window 19, then the dial 43, and then removing the mounting screws 26 whereupon the instrument movement may be lifted out.

In accordance with this invention the field structures and movable coil system of the instrument movement are so arranged and constituted that the movable coils may be removed from the movement without dismantling or altering the basic field structures. Thus the matter of assembly of the instrument movement, and also servicing of the movement is greatly simplified, since fewer parts are involved in the operation of installing or removing the coil assembly. Moreover, by this organization the accuracy of the instrument is not adversely affected during servicing operations, since the basic flux structures may remain completely assembled and not altered.

Referring to Fig. 2, it will be noted that the lower ends of the pole pieces 55 are separated from each other by a space 74 which is sufficiently great to permit passage of the deflecting coil 33 and shaft 35. When the magnetic bridge member 56b is removed, the space 56a existing between the lower end portions of the pole pieces 56 will be large enough to pass the deflecting coil 33 and shaft 35.

Referring to Fig. 3, the C-shaped core 69 has an opening 75 between its ends, which is large enough to permit passage of the restoring coil 51 and shaft 35. Also a space 76 exists between the lower portions of the channel-shaped pole pieces 59 and 60, which is large enough to pass the shaft 35. Thus, considering Figs. 1 and 6, it will be seen that when the instrument movement 11 is removed from the casing 10, the coil springs 45, 47 and 48 disconnected from the regulators 46, 49 and 50 and the bearing screws 72 and 73 removed to release the shaft 35, the said shaft and the coils 33 and 51 may be removed as a unit from the field assemblies by shifting it laterally through the spaces 74, 56a, 75 and 76 provided in the magnet structures.

This is an important advantage since, in the manufacture of the instrument, the field structures may be completely assembled as a unit separate from the movable coil assembly, and the latter may also be assembled as a separate unit whereupon the coil assembly may be easily and quickly installed in the field assembly. If at a future time servicing of the instrument movement is required, the movable coil assembly may be removed from the field structure without disturbing the latter with the exception of removal of the flux bridging member 56b. This member in no way affects the basic flux-producing or flux carrying structures, since it is merely a simple bridging or connector piece. Thus the original flux pattern as initially set up need not be altered during servicing of the instrument movement, and accordingly the accuracy of the movement will not be adversely affected due to flux changes.

As shown in Fig. 7, the dial 43 may be provided with a uniform scale 21 having an arcuate extent of approximately three right angles, the pointer 20 having an effective path of movement of substantially this range. The limits of the scale are shown to be minus 75° C. and plus 50° C., and it will be evident that readings within this range may be easily and quickly taken due to the wide spread and also the uniform spacing of the graduations and temperature increments.

Uniformity of the scale 44 is obtained mainly by virtue of a relationship established between the shapes of the pole pieces and cores of the deflecting field structure and the restoring field structure. It will be noted that the C-shaped core 69 is virtually in the form of a perfect crescent, and that the opposite edges of the channel-shaped pole pieces 59 and 60 are nonsymmetrical, that is, they have different, nonuniform shapes. Where the flux available to the deflecting coil 33 is the weakest, at the space 74 between the pole pieces 55 and at the flux bridging member 56b, the flux which is available to the restoring coil 51 is also the weakest, between the ends of the core 69 and the lower portions of the channel-shaped pole pieces 59 and 60 in the space 76 therebetween.

In accordance with the present invention novel improved sweep-off means are provided for shifting the pointer 20 off the scale 44 to the position shown in Fig. 7 whenever the instrument movement is not energized or in use. As shown in Figs. 4 and 5, this sweep-off means comprises a solenoid coil 77 having an arcuate armature 78 mounted on a shaft 79, Fig. 1, which in turn carries a gear segment 80. The segment 80 meshes with a pinion 81 on a shaft 82, the latter carrying an angular sweep-off arm 83 adapted to engage a projecting finger 84 on a disk 85 carried by the shaft 35. The sweep-off arm 83 is movable through an arc greater than three right angles, from the position shown in Fig. 4 in full lines counterclockwise to the dotted line position shown therein. During such movement, the arm 83 will engage the finger 84 and turn the disk 85 counterclockwise, Fig. 4, to place the finger 84 in the dotted line position indicated wherein the pointer 20 will be held in the off-scale position shown in Fig. 7.

The shaft 79 has a spiral coil spring 85' which is strong enough to move the sweep-off arm 83 counterclockwise from its full line position of Fig. 4 to the dotted line position and to carry with it the movable coil system of the instrument movement, against the opposition of the coil springs 45, 47 and 48. Whenever the solenoid coil 77 is energized, however, it will pull the armature 78 to the position shown in Fig. 5, overcoming the action of the spring 85 and swinging the sweep-off arm clockwise from the dotted line position to the full line position of Fig. 4.

Referring to Fig. 8, the solenoid 77 is connected in circuit with the deflecting and restoring coils of the instrument movement so as to be energized whenever the instrument movement is energized. In Fig. 8, the battery or other source of current 86 is connected by a wire 87 through a current-limiting resistor 88 and wire 89 to the solenoid 77. The solenoid 77 is in turn connected by a wire 90 to bridge resistors 91 and 92, the latter being connected through a wire 93 to the restoring coil 51. This coil is connected by a wire 94 to the deflecting coil 33 which is connected by wires 95 and 96 to the resistor 91. A bridge resistor 97 is connected to the wire 94 and to a wire 98 leading to the battery 86. The wires 95 and 98 are connected by wires 99 and 100 respectively to the two ends of a resistance thermometer bulb 101. An on-off switch 102 may be interposed in the wire 87, and it will be understood that whenever the switch 102 is open the solenoid 77 will be deenergized and the sweep-off system made operative to maintain the pointer 20 in the position of Fig. 7. Whenever the switch 102 is closed, the solenoid 77 will be energized, shifting the sweep-off arm 83 to the full line position shown in Figs. 4 and 5 whereupon the movable coil system of the instrument will be free to assume whatever position is dictated by the current flowing in the deflecting and restoring coils.

I have found that a sweep-off system as described above is simple, effective and reliable in its operation. Moreover, it may be constructed to constitute a unit complete and separate from the instrument movement, being practically wholly contained in the casing 12 as shown in Fig. 1. The sweep-off mechanism is carried on posts 103 secured to the supporting wall 17, being held in place by screws 104, and obviously it may be removed and serviced independently of the instrument movement, and vice versa.

Variations and modifications may be made within the scope of the claims and portions of the improvements may be used without others.

I claim:

1. A large-deflection electric meter comprising a pair of coils of relatively short axial dimension disposed edgewise to each other substantially in a common plane and swingable as a unit about an external axis substantially parallel to said plane; means providing a magnetic field for one coil throughout a deflection greater than two right angles, said means including inner and outer circular-shaped, coextensive magnetic poles having front portions provided with aligned through-cuts substantially at their midpoints, said inner pole linking said one coil, and said means including a readily removable magnetic bridge piece spanning the cut in the outer pole; means providing a pair of oppositely disposed magnetic fields for the other coil, each of said fields acting oppositely on said coil, when the latter is D. C. energized, for a different half of a total deflection greater than two right angles, and said means including a C-shaped core linking said other coil and having its opening in front and aligned with the cuts of the said magnetic poles, and including a pair of opposite magnetic poles separate from said core, defining an opening in front of the core opening, said openings and cuts providing clearance for lateral removal of the said coils when the bridge piece is removed, all without shifting any of said poles and core.

2. A ratio meter comprising a shaft having at one side thereof a deflecting coil and a restoring coil, both said coils being generally flat, disposed substantially in a common plane and edgewise to the shaft, and being spaced apart along the axis of the shaft; means providing a magnetic field for the deflecting coil throughout a deflection of substantially three right angles, said means including inner and outer circular-shaped coextensive magnetic poles having front portions provided with aligned through-cuts substantially at their midpoints, said inner pole linking said deflecting coil, and said means including a readily removable magnetic bridge piece spanning the cut in the outer pole; means providing a pair of oppositely disposed magnetic fields for the restoring coil, each of said fields acting oppositely on said coil, when the latter is D. C. energized, for a different half of a total deflection of substantially three right angles, and said means including a C-shaped core linking said restoring coil and having its opening in front and aligned with the cuts of the said magnetic poles, and including a pair of opposite magnet poles separate from said core, defining an opening in front of the core opening, said openings and cuts providing clearance for lateral removal of the coils and shaft when the bridge piece is removed, all without shifting any of said poles and core.

3. A large-deflection electric meter comprising a pair of generally flat coils disposed edgewise to each other substantially in a common plane and swingable laterally as a unit about an external axis substantially parallel to said plane; means providing a magnetic field for one coil throughout a deflection of substantially three right angles, said means including inner and outer circular-shaped, coextensive magnetic poles having front portions provided with aligned through-cuts substantially at their midpoints, said inner pole linking said one coil, and said means including a readily removable magnetic bridge piece spanning the cut in the outer pole; means providing a pair of oppositely disposed magnetic fields for the other coil, each of said fields acting oppositely on said coil, when the latter is D. C. energized, for a different half of a total deflection of substantially three right angles, and said means including a C-shaped core linking said other coil and having its opening in front and aligned with the cuts of the said magnetic poles, and including a pair of opposite magnetic poles separate from said core, defining an opening in front of the core opening, said openings and cuts providing clearance for lateral removal of the said coils when the bridge piece is removed, all without shifting any of said poles and core.

4. A ratio meter comprising a shaft having at its front a deflecting coil and a restoring coil, both said coils being of relatively short axial dimension and being disposed substantially in a common plane and edgewise to the shaft in spaced relation along the axis of the shaft; means providing a magnetic field for the deflecting coil throughout a deflection greater than two right angles, said means including permanent magnet means at the back of the shaft, including inner and outer circular-shaped coextensive magnetic poles having front portions provided with aligned through-cuts substantially at their midpoints, said inner pole linking said deflecting coil, and said means including a readily removable magnetic bridge piece spanning the cut in the outer pole; means including permanent magnet means at the back of the shaft, providing a pair of oppositely disposed magnetic fields for the restoring coil, each of said fields acting oppositely on said coil, when the latter is D. C. energized, for a different half of a total deflection greater than two right angles, and said means including a C-shaped core linking said restoring coil and having its opening in front and aligned with the cuts of the said magnetic poles, and including a pair of opposite magnet poles separate from said core, defining an opening in front of the core opening, said openings and cuts providing clearance for lateral removal of the coils and shaft when the bridge piece is removed, all without shifting any of said poles and core.

References Cited in the file of this patent

UNITED STATES PATENTS

| Number | Name | Date |
|---|---|---|
| 1,022,517 | Thomson | Apr. 9, 1912 |
| 2,346,683 | Hickok | Apr. 18, 1944 |
| 2,367,950 | Lenehan | Jan. 23, 1945 |
| 2,382,295 | Conrad | Aug. 14, 1945 |
| 2,382,315 | Hiller | Aug. 14, 1945 |
| 2,419,100 | Weaver | Apr. 15, 1947 |
| 2,428,209 | Fleming | Sept. 30, 1947 |
| 2,443,073 | Knudsen | June 8, 1948 |
| 2,456,171 | Bernreuter | Dec. 14, 1948 |
| 2,586,831 | Knudsen | Feb. 26, 1952 |